United States Patent [19]

LaPointe

[11] Patent Number: 5,921,511
[45] Date of Patent: Jul. 13, 1999

[54] SOFFIT CLIP FOR RETAINING A SET OF DECORATIVE LIGHTS UNDER THE EAVE OF A ROOF

[76] Inventor: Leo LaPointe, P. O. Box 119, Nash Creek, New Brunswick, Canada, E0B 1Z0

[21] Appl. No.: 08/807,817

[22] Filed: Feb. 26, 1997

[51] Int. Cl.⁶ .................................................. F16L 3/12
[52] U.S. Cl. .............................. 248/73; 248/58; 248/74.1
[58] Field of Search ............................... 248/73, 58, 62, 248/65, 68.1, 69, 74.1, 220.21, 220.31, 304

[56] References Cited

U.S. PATENT DOCUMENTS

| | | | |
|---|---|---|---|
| 2,265,393 | 12/1941 | Place | 248/73 |
| 2,278,691 | 4/1942 | Cotter | 248/73 |
| 2,332,855 | 10/1943 | Jones | 248/68.1 |
| 2,658,247 | 11/1953 | Heuer | 248/73 |
| 2,923,510 | 2/1960 | Walch | 248/68.1 |
| 3,124,327 | 3/1964 | Meszaros | 248/304 X |
| 3,193,229 | 7/1965 | Stock | 248/304 X |
| 3,235,209 | 2/1966 | Seckerson et al. | 248/73 |
| 3,736,600 | 6/1973 | Drinkwater . | |
| 4,011,397 | 3/1977 | Bouche | 248/74.1 X |
| 5,056,747 | 10/1991 | Kireta . | |
| 5,082,225 | 1/1992 | Nespoli . | |
| 5,141,192 | 8/1992 | Adams . | |
| 5,667,177 | 9/1997 | Van Leeuwen et al. | 248/73 X |
| 5,704,573 | 1/1998 | de Beers et al. | 248/73 |

Primary Examiner—Leslie A. Braun
Assistant Examiner—Stephen S. Wentsler
Attorney, Agent, or Firm—Palmer C. DeMeo; Mario D. Theriault

[57] ABSTRACT

A clip for retaining a set of decorative lights under the eave of a house having vented vinyl soffit panels. The clip is made of a slender strip of a resilient material having a major cross-section dimension which is smaller than the size of the perforations in the soffit panels. The slender strip has a backward bend in a mid-region thereof, defining a first leg member and a second leg member. The first leg member extends from the backward bend in a generally straight alignment defining a supportive axis of the clip. The second leg member has a first segment extending from the backward bend alongside the first leg member and a second segment extending from the first segment and defining an open loop having an opening contiguous with the first segment. This opening has a breath which is smaller than a size of the loop. The first leg member is insertable entirely into one of the perforations of the soffit panel and is readily oriented with the supportive axis of the clip laying over the upper surface of the soffit panel. When a cord of a set of decorative lights is hung from the loop, a bending moment caused by the weight of the cord in the loop about the backward bend increases a surface pressure of the first leg member against the upper surface of the soffit panel and enhances the retention of the clip to the soffit panel.

20 Claims, 2 Drawing Sheets

SOFFIT CLIP FOR RETAINING A SET OF DECORATIVE LIGHTS UNDER THE EAVE OF A ROOF

FIELD OF THE INVENTION

The present invention relates to a clip for retaining a string of Christmas lights to the underside of an eave of a house and more particularly, the present invention relates to a clip which is insertable in one of the perforations of a vented vinyl soffit panel strip.

BACKGROUND OF THE INVENTION

The use of decorative Christmas lighting on the exterior of residences is a popular practice in North America. Strings of coloured lights are usually installed along the edges of roofs and the cornices of buildings in early December of each year. The lights are lit daily for several hours at sunset until about a week or so after New Years' Day.

Decorative light sets are typically hung on nails and threaded hooks which are installed through the fascia board of the roof. A first inconvenience with this practice is that the nails and hooks remain visible throughout the year. These fasteners alter the appearance of the house and collect webs and other insect works during the spring and summer period. Moreover, the fascia boards of modern houses are usually covered by prepainted aluminum sheeting and any perforation of this protective cover is objectionable.

In this respect, a number of different devices have been developed in the past for retaining Christmas lights along the edges of a roof without using driven-type fasteners. A first example of a device for mounting decorative lights is described in U.S. Pat. No. 5,056,747 issued on Oct. 15, 1991 to Andrew G. Kireta. The article is a C-shaped bracket. The bracket may be clamped to wooden rafters below the eave, to rain gutter or to porch support posts. The C-shaped bracket is also attachable to the roof by inserting one leg of the bracket under a roof shingle. Several clips are provided on the surface of the bracket to accommodate decorative light strings running in any directions.

Another device of the prior art is illustrated in U.S. Pat. No. 5,141,192, issued on Aug. 25, 1992 to William E. Adams. The article has a spiral member on one end and a J-hook on the other end. The J-hook is adapted to retain an electrical cord of a light string and the spiral end is attachable to the outside lip of a rain gutter. The article is workable with an elongated staff such that the Christmas lights may be put up and removed without using a ladder.

One inconvenience of installing a bracket on the rain gutter or over the edge of a roof is that the bracket often becomes bound in snow and ice before the end of the holiday season. It is not uncommon to receive several heavy snow falls and freezing rain in December and early January. Therefore, when the light set is due for being removed, the task must be done with great care to avoid damaging the light bulbs, the mounting brackets and the roof itself. This task is often made quite harsh by typically inclement January winds.

SUMMARY OF THE INVENTION

In the present invention, however, there is provided a clip for retaining a set of decorative lights under the eave of a house where the lights are protected from snow, freezing rain and icicles.

In one aspect of the present invention, the clip is attachable to a soffit panel having perforations of a common nominal diameter. The clip is made of a slender strip of a resilient material having a major cross-section dimension which is smaller than the common nominal diameter of the perforations of the soffit panel.

The slender strip has a backward bend in a mid-region thereof, defining a first leg member and a second leg member. The first leg member extends from the backward bend in a generally straight alignment defining a supportive axis of the clip. The second leg member has a first segment extending from the backward bend alongside the first leg member and a second segment extending from the first segment and defining an open loop having an opening contiguous with the first segment. This opening has a breadth which is smaller than a size of the loop.

One advantage of the soffit clip of the present invention is that the first leg member is insertable entirely into one of the perforations of the soffit panel and is readily oriented with the supportive axis of the clip laying over the upper surface of the soffit panel. When a cord from the set of decorative lights is hung from the loop, a bending moment caused by a weight of said cord in the loop about the backward bend increases a surface pressure of the first leg member against the upper surface of the soffit panel. This surface pressure enhances the retention of the clip to the soffit panel and prevents the clip from moving back out of the perforation.

In another aspect of the present invention there is provided a new method for attaching a set of decorative lights to a perforated soffit panel. The method comprises the steps of inserting the first leg member of a the soffit clip of the present invention entirely into one of the perforations in the soffit panel, in a direction tangential to a surface of the soffit panel, and inserting a cord of the set of decorative lights into the loop of the clip.

This method is particularly efficient in the sense that the clips are manually attachable to a perforated soffit, at any location on that soffit without using any tools and without damaging the surface of the soffit panels. Moreover, the clips are easily removable manually after the holiday season by reversing the installation movement and pulling the clips out of the perforations. The clips may be left on the cord of the decorative light set for future use.

DESCRIPTION OF THE DRAWINGS

The preferred embodiment of the present invention will be further understood from the following description, with reference to the drawings in which.

DETAILED DESCRIPTION OF THE PREFERRED EMBODIMENT

Figure 1:
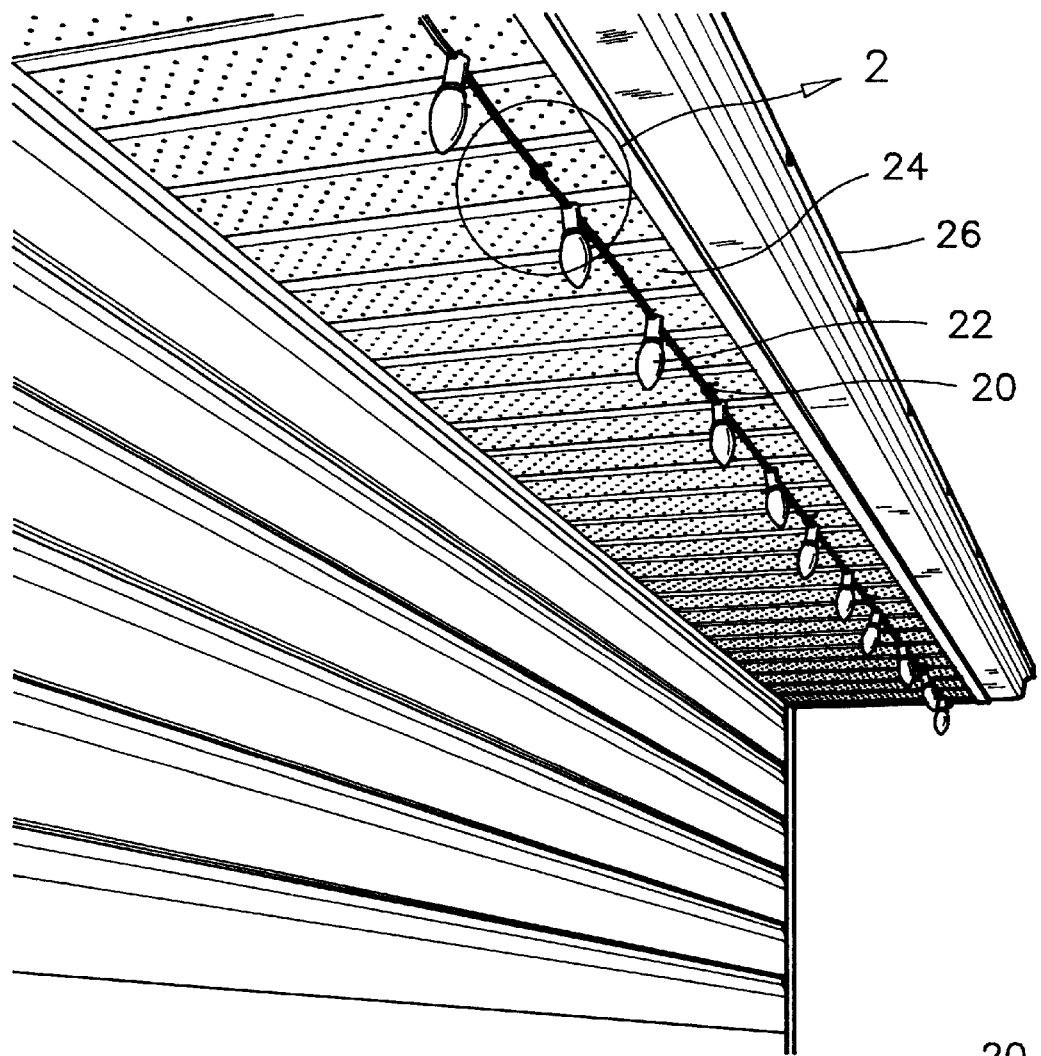
FIG. 1 illustrates a typical installation of a set of decorative lights under the eave of a house using the soffit clips of the preferred embodiment.
Figure 2:
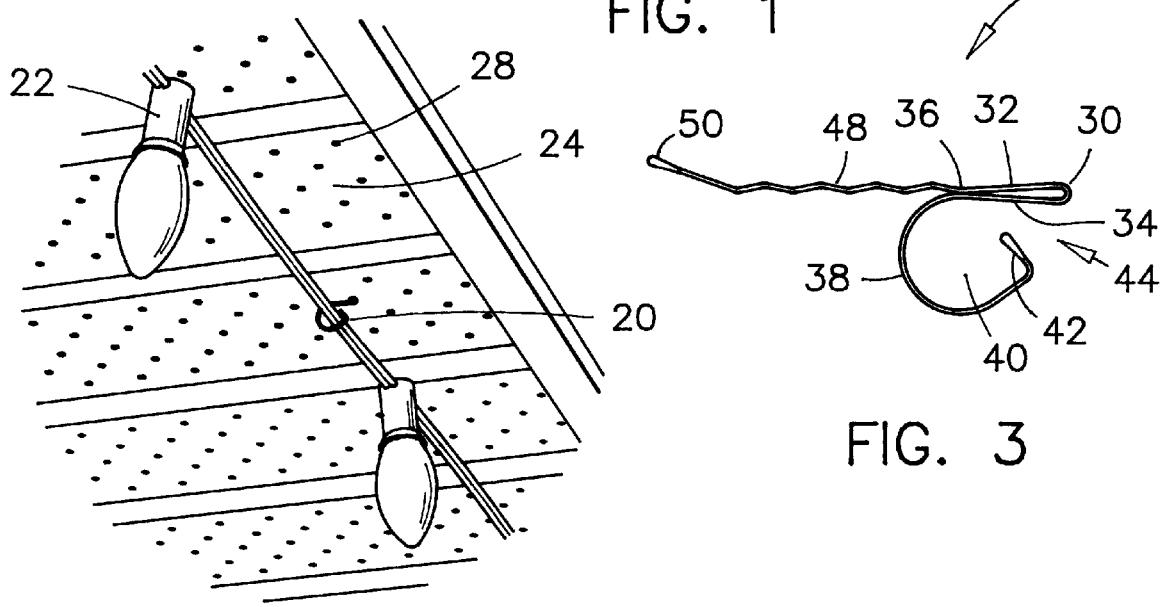
FIG. 2 is an enlarged view of Detail 2 in FIG. 1 showing a closer view of the installation of the set of decorative lights illustrated in FIG. 1.
Figure 3:
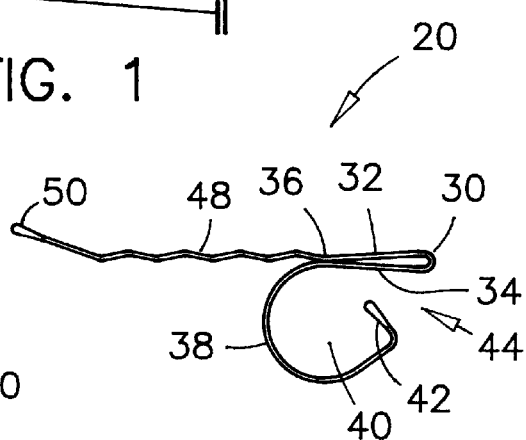
FIG. 3 is a side view of a first model of soffit clip of the preferred embodiment.
Figure 4:
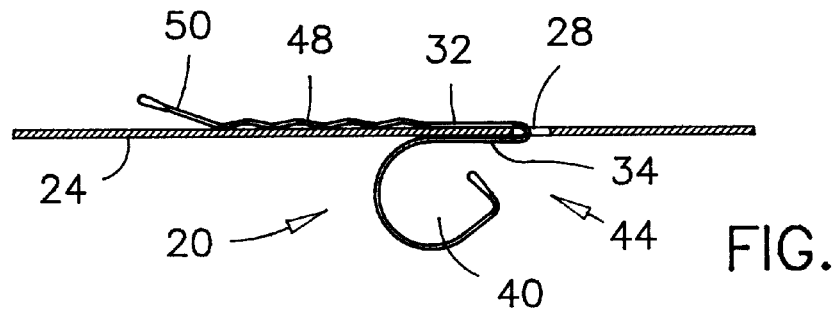
FIG. 4 illustrates a typical installation of the soffit clip of the preferred embodiment through a perforation of a perforated vinyl soffit strip.

The soffit clip 20 of the preferred embodiment and a typical installation thereof are illustrated in FIGS. 1 to 4. The FIGS. 1 and 2 in particular illustrate a preferred installation of a set 22 of decorative Christmas lights under the eave 24 of a roof where the lights are protected from snow, freezing rain and icicles.

This installation is also advantageous because the reflective surfaces above and behind the lights 22 are significantly larger than a reflective surface available when the lights are mounted on the rain gutter 26 for example. The visual appeal of the decoration is thereby enhanced over the traditional installation.

The soffit clip 20 of the preferred embodiment is manufactured with a resilient material preferably a strip of spring steel or stiff plastic material. A preferred material of fabrication for the soffit clip 20 is found in a common hair pin generally known as a bobby pin. These pins are made of spring steel and have a protective coating with enlarged plasticized ends. The protective coating protects the pin from the weather conditions and the enlarged plasticized ends 21 facilitates the manipulation of the clip during installation of a set of decorative lights. Hence, a preferred method for manufacturing the soffit clip 20 of the preferred embodiment is by modifying a bobby pin as it will be explained later.

The soffit clip 20 of the preferred embodiment comprises a continuous strip of spring steel, or similar resilient material, having a backward bend 30 in a mid-region of the strip. A first leg member 32 extends from the backward bend 30 in a generally straight direction defining a supportive axis of the soffit clip 20. A second leg member 34 also extends from the backward bend 30 alongside the first leg member 32. The backward bend preferably has an angle of curvature which is more than 180° such that the second leg member 34 touches the first leg member 32 at a point of contact 36 on an intermediate region of the first leg member 32.

The second leg member 34 has a curled portion 38 extending away from the first leg member 32 towards the backward bend 30 thereby forming an open loop 40 into which an electrical conductor of a set of decorative lights can be retained.

The extremity 42 of the curled portion 36 is bent inwardly relative to the curvature of the loop 40 forming thereby a funnel-like opening 44 of the loop 40 through which an electrical cord is easily insertable.

The first leg member 32 has a generally straight supportive axis with a several ripples 48 in a mid-region thereof adjacent to the point of contact 36. The end 50 of the first leg member 32 is curved away from the supportive axis and from the second leg member 34. This curved end 50 facilitates the insertion of the first leg member 32 into a perforation 28 in the soffit panel 24 in a tangential direction relative to the surface of the soffit panel.

The cross-section of the spring steel material of the clip 20 is smaller than a typical perforation 28 of a commercially available vented vinyl soffit panel strip 24. In this respect, it has been found that a spring steel having a major cross-section dimension being smaller than 0.125 inch is quite satisfactorily. Similarly, a clip having a backward bend with an inside diameter of between 0.060 inch to 0.100 inch has been found to be appropriate for installation of the clip on common soffit panel strips having a thickness of about 0.062 inch.

A typical installation of the soffit clip 20 of the preferred embodiment consists of inserting the curved end 50 of the first leg member 32 into a perforation 28 of a soffit panel strip 24, and pushing the first leg member 32 entirely through the perforation 28 such that the supportive axis of the clip 20 lies over the upper surface of the soffit panel 24. The resilience of the strip at the backward bend 30 exerts a pressure between the first and second leg members 32, 34, to retain the soffit clip 20 in place in the perforation 28.

The ripples 48 on the first leg member 32 also cooperate with the resilience of the backward bend for retaining the soffit clip 20 in the perforation 28, by increasing the friction of the first leg member 32 against the upper surface of the vinyl strip 24.

The electrical cord of the decorative light set may thereafter be installed into the loop 40 by pushing the conductor into the funnel-like opening 44.

One will understand that the installation instructions described above may be reversed according to the preference of a user. The clips 20 can be installed on the electrical cord before the cord is attached to the soffit panel 24. This particular sequence is advantageous for easing a difficult manipulation of small objects at arms length when a user is standing in a ladder and working with gloves for example.

The soffit clip 20 of the preferred embodiment may be installed at various distances from one-another to accommodate any particular application. It has been found that a spacing of about 24 inches to 36 inches is quite appropriate for retaining a common set of Christmas lights. A rubber band (not shown) may be wrapped around a clip 20 and the electrical cord for applying a longitudinal tension in the cord, for preventing an excessive sag in the cord when the clips 20 are spaced too far apart. It is also recommended to install the clips 20 at a distance of about 3 to 6 inches from the fascia board of the eave to adequately protect the lights from snow and freezing rain.

Figure 5:
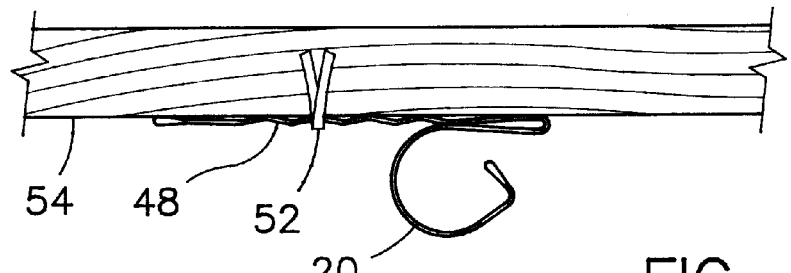
FIG. 5 illustrates a soffit clip of the preferred embodiment stapled to a wood member.

Referring now to FIG. 5, the soffit clip 20 of the preferred embodiment is also attachable with staples 52 in a wood structure 54 for example. The staple 52 is preferably installed over the ripples 48 of the first leg member such that the soffit clip 20 cannot be easily removed from the mounting structure.

Figure 6:
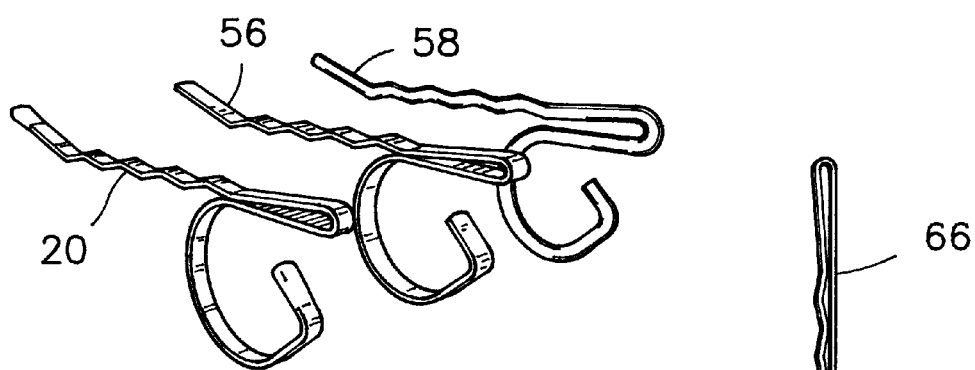
FIG. 6 illustrates three models of the soffit clip of the preferred embodiment.

The soffit clip 20 of the preferred embodiment is manufacturable in various types of resilient material according to the preference of a manufacturer. As it was mentioned earlier, one of the preferred materials of fabrication for the soffit clip 20 is a common hair pin. Other materials include wire-shaped materials such as a flat strip of spring steel 56 and a round wire 58 as illustrated in FIG. 6.

When the soffit clip of the preferred embodiment is manufactured from a flat strip of spring steel 56, the preferred strip has a width of between 0.060 inch to about 0.100 inch and a thickness of about 0.020 inch to about 0.030 inch. When the soffit clip of the preferred embodiment is manufactured with round wire 58, the diameter of the round wire is preferably between about 0.060 inch to about 0.100 inch. The overall dimensions of the soffit clip 20 of the preferred embodiment are a total length of about 2.0 inches and a loop size having a diameter of about 0.50 inch.

Figure 7:
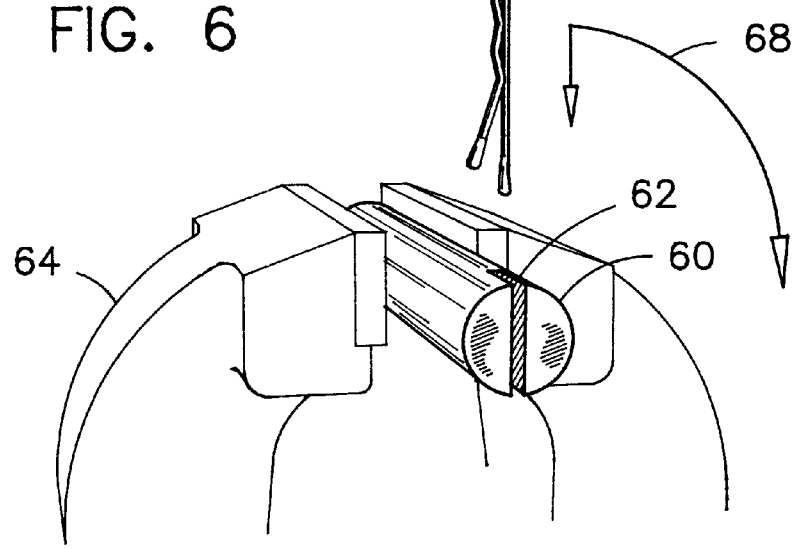
FIG. 7 illustrates a method for manufacturing the soffit clip of the preferred embodiment.

One method for manufacturing the soffit clip 20 of the preferred embodiment is illustrated in FIG. 7. The method requires the use of a round bar 60 having a slot 62 through one of its end. The bar 60 is preferably held in a workshop vice 64 and oriented horizontally. The straight portion of a bobby pin 66 is inserted into the slot 62, and the pin 66 is bent in the direction as indicated by arrow 68 in FIG. 7. This method is particularly efficient for producing the desired result consistently and without great expense in tooling.

While the above description provides a full and complete disclosure of the preferred embodiment of this invention, various modifications, alternate constructions and equivalents may be employed without departing from the true spirit and scope of the invention. Such changes might involve alternate components, structural arrangements, construction features or the like. Therefore, the above description and the illustrations should not be construed as limiting the scope of the invention which is defined by the appended claims.

I claim:

1. A soffit clip for retaining a set of decorative lights to a soffit panel having perforations of a common diameter, said soffit clip comprising:

a slender strip of resilient material comprising;

a sharp backward bend defining a pair of substantially equal-length first and second leg members;

said first leg member extending from said backward bend in a generally straight direction defining a supportive axis of said soffit clip, said second leg member having a first segment extending from said backward bend alongside said first leg member and a second segment extending from said first segment and defining an open loop having an opening contiguous with said first segment, said opening having a breadth being smaller than a size of said loop; and said slender strip of resilient material being formed from a hair pin commonly known as a bobby pin incorporating a small cross section relative to the length of said first and second leg members, and a substantial resiliency;

whereby said first leg member is adapted to be inserted entirely into one of said perforations with said supportive axis being adapted to be laid over a surface of said soffit panel, and said loop is adapted to support therein a cord from a set of decorative lights, such that a bending moment caused by a weight of said cord in said loop about said backward bend increases a surface pressure of said first leg member against said surface of said soffit panel for retaining said soffit clip to said soffit panel.

2. The soffit clip as claimed in claim 1 wherein said first leg member has on an intermediate region thereof a series of ripples for increasing a friction of said first leg member against said surface of said soffit panel.

3. The soffit clip as claimed in claim 2 wherein an extremity of said first leg member is angled away from said supportive axis and from said second leg member, for facilitating an insertion of said first leg member into said one of said perforations in a direction substantially tangential to said supportive axis.

4. The soffit clip as claimed in claim 3 wherein said sharp backward bend has an angle of curvature which is more than 180° and said first segment of said second leg member touches said first leg member at an intermediate region of said first leg member, whereby when said soffit clip is adapted to be installed on said soffit panel, a resilience of said backward bend causes a pressure between said first leg member and said first segment of said second leg member for increasing a retention of said soffit clip against said soffit panel.

5. The soffit clip as claimed in claim 4 wherein said sharp backward bend has an inside diameter which is between about 0.060 inch and about 0.100 inch.

6. The soffit clip as claimed in claim 3 wherein an end portion of said second leg member is curved toward an inside region of said loop whereby said opening is a funnel-like opening oriented toward said inside region of said loop.

7. The soffit clip as claimed in claim 3 wherein said resilient material is a spring steel.

8. The soffit clip as claimed in claim 7 wherein said slender strip is a flat strip having a width of between about 0.060 inch and about 0.100 inch and a thickness of between about 0.020 inch and about 0.030 inch.

9. The soffit clip as claimed in claim 3 wherein said slender strip has enlarged plasticized ends.

10. The soffit clip as claimed in claim 3 wherein a length of said first leg member is about 2 inches and a diameter of said loop is about 0.5 inch.

11. A soffit clip for retaining a set of decorative lights to a soffit panel having perforations of a common diameter, said soffit clip being made of a slender wire-shaped strip of a resilient material, said slender wire-shaped strip having:

a substantially constant cross-section throughout its length;

a major cross-section dimension which is capable of being smaller than said common diameter;

a sharp backward bend in a mid-region thereof, said backward bend defining a pair of substantially equal-length first and second leg members;

said first leg member extending from said backward bend in a generally straight direction defining a supportive axis of said soffit clip, said second leg member having a first segment extending from said backward bend alongside said first leg member and a second segment extending from said first segment and defining an arcuate open loop having an opening contiguous with said first segment, said opening being funnel-shaped and having a breadth which is smaller than a size of said loop; and said first leg member having an extremity being angled away from said supportive axis and from said second leg member, for facilitating an insertion of said first leg member into one of said perforations in a direction substantially tangential to said supportive axis, when said first leg member is inserted in said one of said perforations.

12. The soffit clip as claimed in claim 11 wherein a base material for said slender strip made of a resilient material is a hair pin commonly known as a bobby pin.

13. The soffit clip as claimed in claim 11 wherein said slender strip is a round wire having a diameter of between about 0.060 inch and about 0.100 inch.

14. In combination, a soffit panel having perforations of a common diameter, a set of decorative lights comprising an electrical cord, and a soffit clip retaining said electrical cord to said soffit panel; said soffit clip comprising:

a slender strip of resilient material comprising;

a sharp backward bend defining a pair of substantially equal-length first and second leg members;

said first leg member extending from said backward bend in a generally straight direction defining a supportive axis of said soffit clip, said second leg member having a first segment extending from said backward bend alongside said first leg member and a second segment extending from said first segment and defining an open loop having an opening contiguous with said first segment, said opening having a breadth being smaller than a size of said loop; and said slender strip of resilient material being formed from a hair pin commonly known as a bobby pin incorporating a small cross section relative to the length of said first and second leg members, and a substantial resiliency;

said first leg member is inserted entirely into one of said perforations with said supportive axis being laid over a surface of said soffit panel, and said loop supports said cord from said set of decorative lights, such that a bending moment caused by a weight of said cord in said loop about said backward bend increases a surface pressure of said first leg member against said surface of said soffit panel thereby retaining said soffit clip to said soffit panel.

15. The combination as claimed in claim 14, wherein an extremity of said first leg member of said soffit clip is angled away from said supportive axis and from said second leg member, for facilitating an insertion of said first leg member into said one of said perforations in a direction substantially tangential to said supportive axis.

16. The combination as claimed in claim 15 wherein said first leg member of said soffit clip has on an intermediate region thereof a series of ripples that increases a friction of said first leg member against said surface of said soffit panel.

17. The combination as claimed in claim 16 wherein said sharp backward bend of said soffit clip has an angle of curvature which is more than 180° whereby when said soffit clip is unattached from said soffit panel said second leg member touches said first leg member at an intermediate region of said first leg member, and whereby when said soffit clip is attached to said soffit panel, a resilience of said backward bend causes a pressure between said first leg member and said first segment of said second leg member thereby increasing a retention of said soffit clip against said soffit panel.

18. The combination as claimed in claim 17 wherein an end portion of said second leg member of said soffit clip is curved toward an inside region of said loop whereby said opening is a funnel-like opening oriented toward said inside region of said loop.

19. The combination as claimed in claim 14 wherein said resilient material of said soffit clip is a spring steel.

20. The combination as claimed in claim 19 wherein said slender strip of said soffit clip is a flat strip having a width of between about 0.060 inch and about 0.100 inch and a thickness of between about 0.020 inch and about 0.030 inch.

* * * * *